United States Patent [19]

Parham

[11] 4,031,879

[45] June 28, 1977

[54] SOLAR ENERGY CONVERSION PLANT
[76] Inventor: J. P. Parham, R.R. 2, Box 475, Melbourne, Fla. 32901
[22] Filed: Oct. 28, 1975
[21] Appl. No.: 625,856
[52] U.S. Cl. .............................................. 126/271
[51] Int. Cl.² .......................................... F24J 3/02
[58] Field of Search ............ 126/270, 271; 237/1 A
[56] References Cited
UNITED STATES PATENTS

| 659,450 | 10/1900 | McHenry | 126/271 |
|---|---|---|---|
| 842,658 | 1/1907 | Haskell | 126/271 |
| 2,467,885 | 4/1949 | Freund | 126/271 |
| 2,519,281 | 8/1950 | Presser et al. | 126/271 |
| 2,553,302 | 5/1951 | Cornwall | 126/271 |

FOREIGN PATENTS OR APPLICATIONS

| 621,392 | 2/1927 | France | 126/271 |
|---|---|---|---|
| 555,420 | 3/1923 | France | 126/270 |

Primary Examiner—Carroll B. Dority, Jr.

[57] ABSTRACT

A solar heating plant incorporating means to condense and focus solar energy on an elongated heat exchange member which is in communication with a fluid which is circulated thru a thermal storage means to heating radiators. An alternate embodiment is disclosed wherein the heating fluid is water and the system provides hot water for general purpose use in addition to hot water for the radiating elements.

7 Claims, 12 Drawing Figures

SOLAR ENERGY CONVERSION PLANT

BACKGROUND AND OBJECTS OF THE INVENTION

The present invention relates to a solar heating plant adapted to provide heat and hot water for a dwelling or similar habitable structure.

Modern civilization is a product of technology resulting from readily available sources of economical power and heat. Unfortunately, as civilization advances and creates increased demands for energy, the readily available and classical sources become inadequate to meet civilization's demands. Therefore, new sources of energy must be tapped to satisfy modern technology's ever increasing demands.

Numerous solar energy plants of various design adapted to provide heat and hot water have been contrived throughout man's recorded history. Unfortunately, the efforts to date are inefficient and do not provide adequate heating capabilities during inclement weather, at night or when it is most needed during the short days of the winter months. Attempts to overcome the various inefficiencies of known systems have resulted in increasingly complex solar energy plants which become prohibitively costly and unreliable due to the increased complexity and failure modes.

Attempts have been made to simplify the solar heating problem by providing a plurality of heat absorbing surfaces. These attempts have also met with economical failure due to the costs involved in procuring and installing the large number of heat exchange units required and because of their tendency to reradiate absorbed heat into the atmosphere whenever the sun is not shining on the heat exchange elements.

It is an objective of the present invention to provide an apparatus which overcomes the aforementioned problems by providing a simple, relatively low cost solar heating plant adapted to provide both heat and hot water.

A further objective of this invention is to provide a solar heating plant which utilizes a condensing lens adapted to follow the sun and focus its energy on a relatively small heat exchange surface to minimize reradiation losses.

A still further objective of the present invention is to provide a solar fluid heater capable of achieving temperatures high enough to cause movement of the fluid thru the total heating system without the aid of pumps.

A further objective of this invention is to provide a solar water heater capable of providing heated fluid for a closed cycle heating system in which the fluid is moved as a function of the sun's energy during periods of heat generation and by a pump means when the sun is not shining.

It is a still further objective of the present invention to provide a solar heating system which includes a recirculation means for heating fluid in combination with means to add additional water automatically as hot water is extracted from the system.

The foregoing and other objectives of the invention will become obvious when one considers the following specification and drawings wherein:

SUMMARY OF THE INVENTION

The invention described and defined herein is a solar energy system adapted to derive heat from the sun for warming a dwelling or similar structure and in an alternate embodiment providing hot water for utility purposes. It includes a heat exchange unit which has a relatively small heat absorbing area thermally connected to a plurality of heat exchange plates immersed in a heat absorbing fluid. An elongated condensing lens driven by means to cause the lens to track the sun is positioned over the heat absorbing area to focus the sun's rays thereon and generate higher temperatures than would be normally achievable. A storage tank is provided to which heated fluid is driven by increasing vapor pressures in the heat exchange unit. Radiating means are provided within the structure being heated by the system and connected between the storage unit and heat exchange unit in such a way that heated fluid is circulated from the storage tank to the heat exchange unit during periods that it is irradiated by the sun and to the heat storage unit when the sun is not shining.

In an alternate embodiment of the instant invention a cold water line is connected to the heat exchange unit by a one-way valve and hot water is provided for utility purposes from the heat storage unit.

DESCRIPTION OF THE PREFERRED EMBODIMENT

Figure 1:
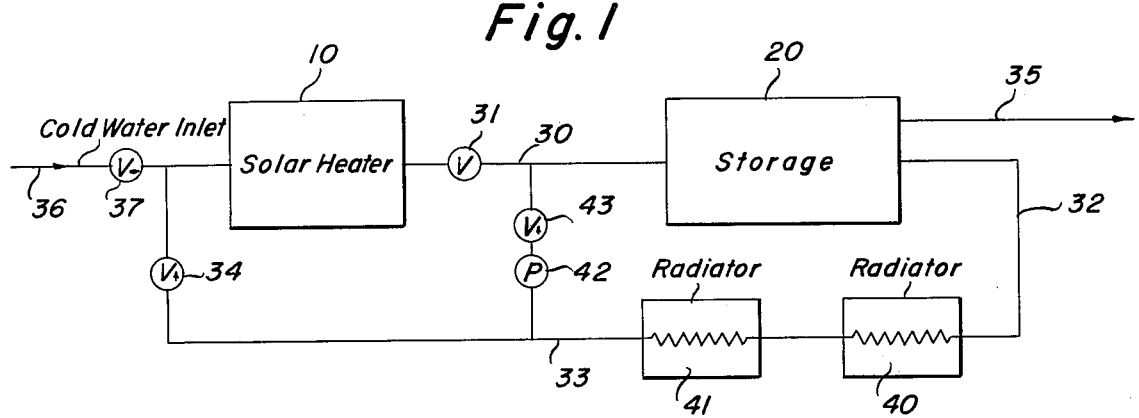
FIG. 1 is a schematic block diagram illustrating the basic principles of the instant invention.

FIG. 1 represents a preferred embodiment of the instant invention. In this embodiment a solar heater 10 is connected to a storage tank 20 by a pipe 30 which includes a one-way pressure valve 31. This pipe and valve function to allow the heat absorbing fluid from the solar heater to flow into the storage tank 20. The one-way pressure valve 31 is provided in the line to prevent fluid flow from the heater 10 to the storage tank 20 until the fluid in the heater has reached a predetermined temperature which causes the vapor pressure therein to exceed a predetermined value. This provides temperature regulation of the storage tank and eliminates any necessity for thermostatic control and pressure release valves.

Heated fluid from the storage tank 20 flows thru pipe means 32 to a plurality of radiators 40 and 41. The radiators are connected in series or series parallel depending upon the individual requirements of a structure being heated. The return flow from the radiators is via pipe 33 thru a one-way valve 34 and into the solar heater 10. Thus when the temperature of the fluid within the solar heater reaches a predetermined value, the vapor pressure therein causes pressure valve 31 to open and heated fluid flows to the storage tank, thru the radiators and back to the solar heater.

When the sun is not heating the solar heater 10, pressure relief valve 31 will remain closed but the system may be operated by turning on pump 42 which causes fluid flow from the radiators thru one-way valve 43 to the storage tank 20. This causes heated water in the storage tank 20 to flow thru pipe 32 into the radiators 40 and 41. An outlet is annotated 35 in FIG. 1 and it provides hot water to the hot water distribution system of the building serviced by the solar heating system. A cold water inlet 36 is provided to replace water extracted at 35. A one-way valve 37 is provided in the cold water inlet line to prevent reverse flow out of the system.

Figure 2:
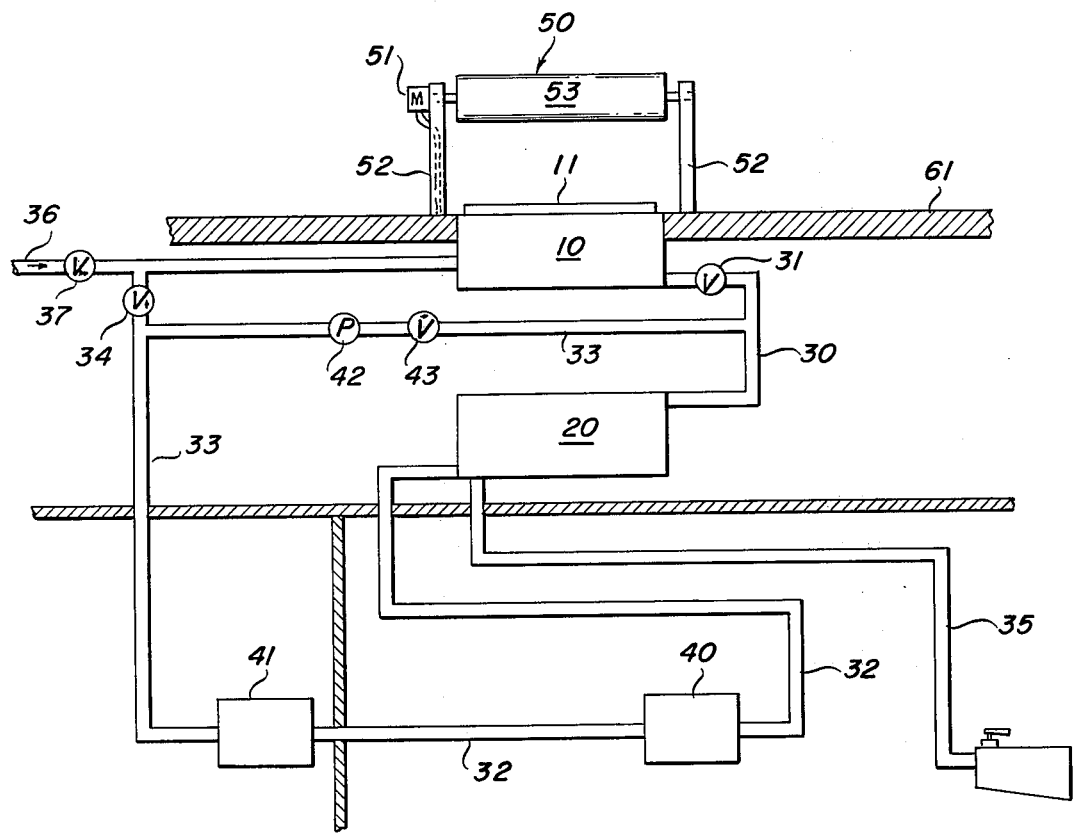
FIG. 2 is a perspective view of the invention installed in a dwelling.

FIG. 2 illustrates an exemplary installation in a residence. In this figure, the components are interconnected as described in FIG. 1 and similar reference designators are incorporated. This figure depicts the lens system 50 which is supported by two bipod leg arrangements 52 over the solar heater 10. A motor 51 is supported by a bipod 52 and functions to drive lens 53 so that it continually focuses the sun's rays on the heat absorbing strip 11 of the solar heater. The lens 53 is supported at bipod 52 by a simple bearing arrangement.

The bipod legs 52 are affixed to the structure roof by any means acceptable to local building ordinances. The roof 61 may be flat or slanted at any angle and the bipod legs 52 adjusted to accomodate for the angle. The only alteration required to install the system in the roof is a small oblong opening large enough to allow only the heat absorber 11 to pass thru. The solar heater is supported at the underside of the roof by any suitable fastening means which will be a function of the basic roof structure.

The storage tank 20 is located in the attic of the structure or any other suitable location. It is recommended however that the storage tank be placed as close as possible to the solar heater 10 to minimize heat losses there between.

Figure 3:
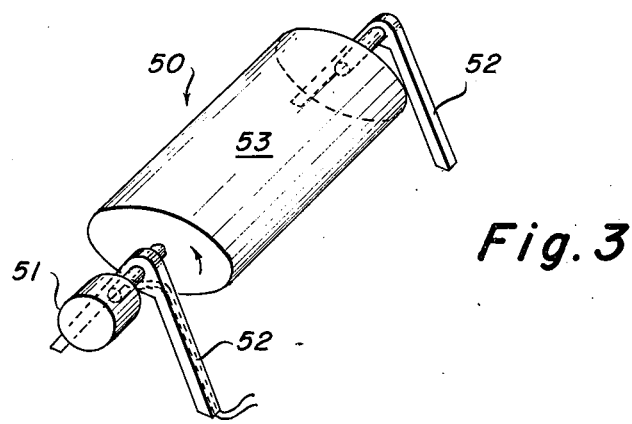
FIG. 3 is a perspective view of the condensing lens assembly of the instant invention.

The radiators 40 and 41 may be positioned any place within the structure as dictated by sound heat engineering principles. FIG. 3 is a perspective view of the lens assembly 50. It more clearly illustrates the motor 51 which is a variable speed motor adapted to drive the lens 53 thru a gear train to form a timing assembly adapted to cause the lens 53 to track the sun. The gear train may be similar to the differential mechanism disclosed in W. F. Williams' U.S. Pat. No. 2,896,476 issued July 28, 1959 of M. Koller's French Pat. No. 555,420 published June 29, 1923. Electrical power and motor control functions are connected to the motor 51 thru one leg of bipod 52 which functions as an electrical conduit.

Figure 4A:
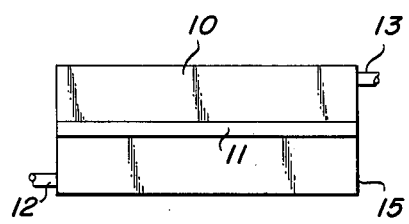
FIG. 4a is a top view of the solar heater.

FIG. 4a is a top view of the solar heater 10 which depicts the heat absorbing means 11 which is centered in the top of the structure and positioned longitudinally. This unit is installed in relation to the longitudinal axis of the mirror 53 as can be seen in FIG. 2. Fluid inlet to the solar heater 10 is provided by coupling 12 and heated fluid outlet is provided by coupling 13.

Figure 4C:
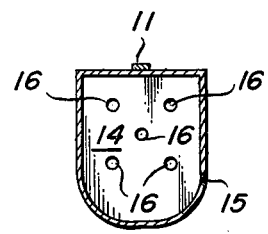
FIG. 4c is a cutaway end view of a solar heater.
Figure 4B:
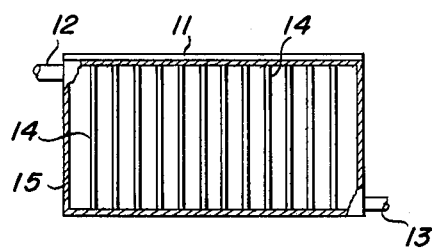
FIG. 4b is a side, cutaway view of the solar heater illustrating heat exchange plates.

FIG. 4b is a cutaway view of the solar heater depicting the plurality of verticle plates 14 which are thermally connected to heat absorber 11. These plates, 14, descend from heat absorber 11 to the bottom of the tank 15 which functions as a housing for the heat absorber. As can be seen in the illustration, a large number of plates are provided and spaced close together but not so close as to impede fluid flow there between. They function as heat exchange members to conduct heat from heat absorber 11 to the heat absorbing fluid.

FIG. 4c is an end view of the heater which illustrates the configuration of the individual heat exchange plates 14. Note that a plurality of holes 16 are provided in the plates to permit fluid to flow longitudinally thru the case 15. These holes are positioned in alternate locations on alternate heat exchange plates to insure that the fluid flows over the total surface of the individual plates.

Figure 4D:
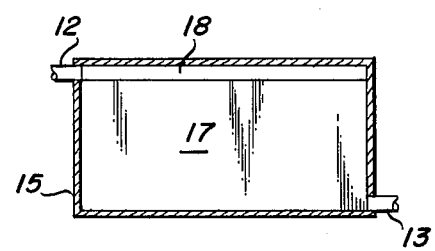
FIG. 4d is a side cutaway view of the solar heater illustrating an alternate embodiment of heat exchange plates.

FIG. 4d is an alternate embodiment of the heater wherein heat exchange plates 14 are replaced by heat exchange plates 17. The heat exchange plates 17 are positioned longitudinally in the housing 15 and spaced so that water will flow there between.

Figure 4E:
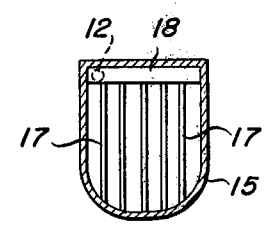
FIG. 4e is an end cutaway view of the solar heater illustrating an alternate embodiment of the heat exchange plates.

FIG. 4e is an end cutaway view of a heater and it illustrates the fluid inlet manifold which is adapted to disperse the fluid thru all of the parallel exchange plates.

Figure 5A:
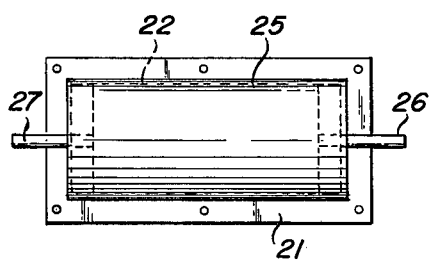
FIG. 5a is a top cutaway view of the heat storage system.

FIG. 5a is a top view of the heat storage means 20 which is cutaway to show the outer shell 21 and inner storage tank 22 which is supported within the outer shell 21 by a bed of insulating material 23.

Figure 5B:
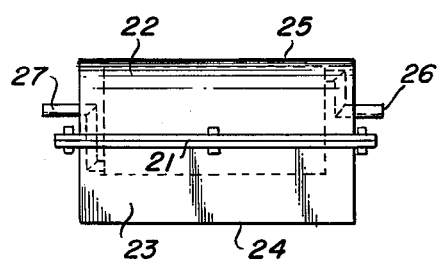
FIG. 5b is a side cutaway view of the heat storage system.

FIG. 5b is a side view of the heat storage system which illustrates the construction of the outer shell 21. Note that it is comprised of a bottom section 24 and a top section 25, the two of which are fastened together by a plurality of fastening means such as dogs or nuts and bolts. This figure also illustrates the inlet pipe 26 and the outlet pipe 27 which are configured such that the hot water or fluid enters at the top of the tank and exits at the bottom. The curvature of the inlet and exit pipes is configured to permit the bottom half of the shell to be positioned on a supporting base, and readied to receive the fluid storage tank 22 which may then be completely connected prior to installing the cover or top half 25 of the storage tank shell.

Figure 5C:
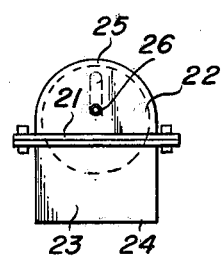
FIG. 5c is an end cutaway view of the heat storage system.

FIG. 5c is an end view of the storage assembly 20 illustrating the flat bottom which is provided to facilitate installation on any suitable flat surface and the domed upper shell 25 adapted to minimize the bulk of the assembly.

Figure 6:
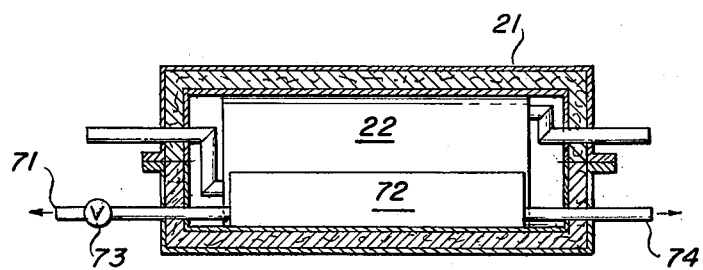
FIG. 6 is a cutaway view of an alternate embodiment of the heat storage system which incorporates a separate water storage means.

FIG. 6 illustrates an alternate embodiment of the subject invention which utilizes a heat exchange fluid which will not freeze under normal ambient conditions. In this embodiment, hot water for general utility purposes is provided by a separate system which includes a cold water inlet 71 coupled to a water heating tank 72 via a one-way valve 73. The water heating tank 72 is positioned within the outer shell 21 of the heat storage assembly 20 and in thermal contact with the heat absorption fluid tank 22. The water outlet 74 of tank 72 is connected to the hot water distribution system in the same way as discussed and illustrated for the alternate embodiments presented in FIGS. 1 and 2.

From the preceding description of the apparatus, it is apparent that there are many arrangements which will operate in accordance with the general principles set forth. Therefore, the scope of the appended claims should not be limited to the specific embodiments disclosed by way of explanation in this specification.

What I claim as a new and useful contribution to the art and desire to protect by letters patent is:

1. A solar energy conversion plant, comprising:
   a solar radiation converter system including,
   a solid radiation to heat converter, a plurality of heat exchange members thermally connected to said radiation to heat converter and a housing adapted to support said radiation converter and form a container for said heat exchange members wherethrough a heat absorbent fluid is circulated;
   a fluid circulating system adapted to inject a heat absorpitive fluid into said solar radiation converter system at a first temperature and extract said fluid from said system at a second temperature wherein said second temperature is greater than said first temperature;
   a fluid storage means adapted to receive heated fluid from said solar radiation converter system, said receiving means including a one-way pressure valve adapted to permit fluid transfer from said radiation converter system to said storage means when the differential pressure therebetween exceeds a predetermined value;
   heat radiation means adapted to receive heated fluid from said storage means;
   means to return said fluid from said radiation means to said solar radiation converter system including a one-way valve;
   a solar radiation converter system bypass connected between said radiation means return fluid line and said storage means, said interconnection to said storage means adapted to be downstream of said pressure valve;
   a fluid pump in said bypass system; and
   a one-way valve between said fluid pump and said storage means.

2. A solar energy conversion plant as defined in claim 1, comprising:
   A lens system including, a lens adapted to condense solar radiation and focus said radiation on said radiation converter means and means to move said lens in synchronization with the sun so that the radiation therefrom is constantly focused on said radiation converter means.

3. An apparatus as defined in claim 2 wherein said heat absorbing fluid is water, comprising:
   A fresh water inlet connected to said solar radiation converter;
   a one-way valve between said solar radiation converter and said fresh water inlet adapted to permit fresh water to enter said solar energy conversion plant; and
   means to remove heated water from said storage means via hot water faucets in structure related to said solar energy conversion plant.

4. A solar energy conversion plant as defined in claim 2 wherein said heat absorptive fluid is a fluid having a freezing point less than the coldest expected ambient temperature in which the system is to operate.

5. A solar energy conversion plant as defined in claim 4, comprising:
   A fresh water heat exchange and storage means in thermal contact with said storage means and means to permit fresh water to enter said water storage means and exit said storage means to the hot water distribution system of the structure in which the solar energy conversion plant is installed.

6. A solar energy conversion plant as defined in claim 2 wherein said storage means comprises:
   An outer container including a lower section adapted for mounting on a structure and a removable upper section;
   a fluid storage tank dimensioned to fit within said outer container; and
   thermal insulation adapted to encompass said storage tank within said outer container.

7. A solar energy conversion plant as defined in claim 6 further including a second liquid storage tank adapted to fit within said outer container and in thermal contact with said storage tank.

* * * * *